United States Patent [19]
Hooper et al.

[11] 3,902,371
[45] Sept. 2, 1975

[54] LIQUID SAMPLE PROBE APPARATUS

[75] Inventors: James F. Hooper, Darien, Conn.; Edwin H. Mernyk, North Tarrytown, N.Y.

[73] Assignee: Technicon Instruments Corporation, Tarrytown, N.Y.

[22] Filed: Jan. 11, 1974

[21] Appl. No.: 432,776

[52] U.S. Cl. .............................. 73/423 A
[51] Int. Cl.² .............................. G01N 1/12
[58] Field of Search .......... 73/423 A; 23/259

[56] References Cited
UNITED STATES PATENTS

| | | |
|---|---|---|
| 3,134,263 | 5/1964 | De Jong .......................... 73/423 A |
| 3,193,359 | 7/1965 | Baruch et al. ................... 73/423 A |
| 3,754,443 | 8/1973 | Harris, Sr. et al. .............. 73/423 A |

Primary Examiner—S. Clement Swisher
Attorney, Agent, or Firm—S. P. Tedesco; Stephen E. Rockwell

[57] ABSTRACT

Liquid sample probe apparatus for an automated sample analyzer, including a movably mounted suction intake tube having an inlet end for immersion in liquid of a succession of containers, a device to move the tube to raise and lower the tube inlet end to present the latter successively to the containers, and a motion damper to damp the raising movement of the tube inlet end from the contents of such a container to prevent throw of fluid from the tube.

9 Claims, 3 Drawing Figures

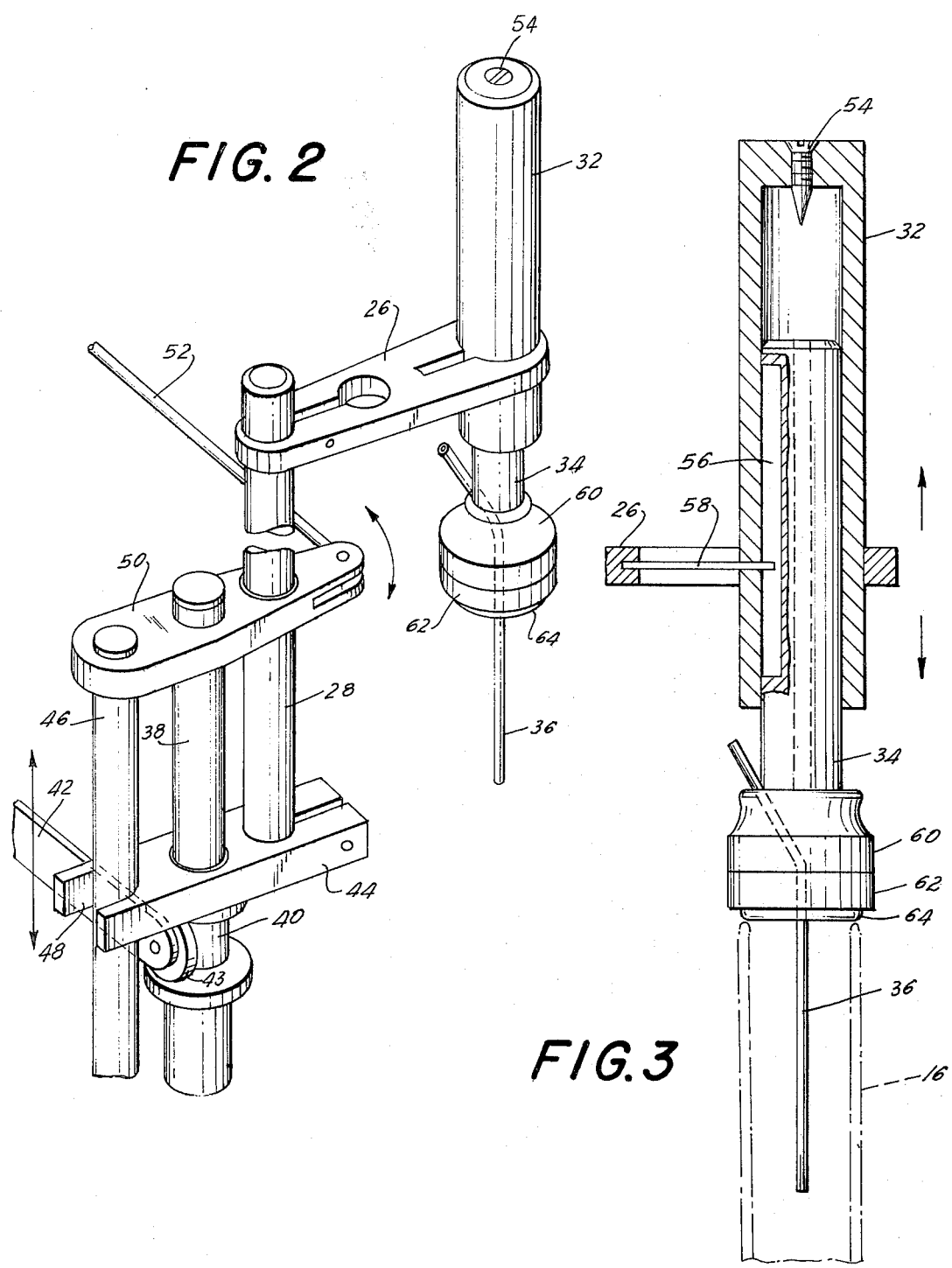

LIQUID SAMPLE PROBE APPARATUS

BACKGROUND OF THE INVENTION

1. Field of the Invention

This invention relates to liquid sample probe apparatus of the automated type, for sampling a series of samples at a relatively high sampling rate.

2. Prior Art

There is illustrated and described in De Jong U.S. Pat. No. 3,134,263, issued May 26, 1964, a sampler for automated analysis apparatus which may take the form of that illustrated and described in Skeggs et al., U.S. Pat. No. 3,241,432, issued Mar. 22, 1966. Typically, a sampler of this type, which is equipped with a liquid sample probe assembly for aspirating a series of samples and wash liquid between samples, delivers to such analytical system samples at the rate of approximately 60 an hour. The probe has a vertical movement for insertion in and removal from the liquid contents of each separate sample container presented thereto by a movable sample container tray, and also for probe insertion in and removal from a stationary wash liquid reservoir located laterally of the tray. In order for the probe to travel to the wash liquid reservoir between immersions in sample containers, the probe also has a horizontal traversing movement. At such analytical rates, the vertical movement of the probe may be relatively slow. It is known to provide a probe which is supported for floating or lost motion so that it is vertically self-adjusting on abutment with liquid containers arranged at different height levels.

There is presently a demand for an automated analyzer of this general type but having higher analytical rates requiring liquid sample probe apparatus moving such a probe at much higher speeds to supply a much larger number of samples to such analyzer in a given time period, say 150 samples an hour.

It has been found that at such high-speed performance of a probe having such lost motion, severe problems of probe shock and vibration were created at the termination of such floating movement or lost motion of the probe. On such termination, the probe member had a high impact with a probe supporting element. The probe is typically of capillary tubing and at such high analytical rates aspirates relatively very small total amounts of samples, such as on the order of approximately 0.2 ml of each sample, for example. In aspirating the total sample volume for up to approximately 40 different analytical tests on each sample, the probe may peck each sample by reimmersions therein. Between immersions in a sample the probe aspirates air or gas, creating gas segments between liquid segments of each sample, which gas segments cleanse the tubing wall to prevent contamination of a following sample by a preceding sample. The probe aspirates wash liquid in which it is immersed between samples, which wash liquid forms a liquid segment isolated from neighboring samples by a pair of gas segments. Such probe shock and vibration caused, on termination of probe immersion in a liquid on outward probe movement, spattering or splash of liquid from the probe exterior into the environment. Such spattering of liquid is not only messy but also may be a health hazard. For example, blood samples may carry communicable diseases.

Such shock or impact on such probe lifting movement may also be prejudicial to analytical results because of the inertia of fluids carried within the probe. For example, a portion of a fluid segment, previously aspirated in the probe, may be dislocated and lost from the probe due to the force of inertia on a liquid segment in the probe. Vibration of the probe may also cause such loss of fluid from the probe. Loss of sample, for example, results in improper automated dilution of sample affecting analytical results.

The present invention contemplates the virtual elimination of these problems in liquid sample probe apparatus for an automated analyzer having a high analytical rate of, say, 150 samples an hour.

SUMMARY OF THE INVENTION

Accordingly, one object of the invention is to provide improved automated probe apparatus for the supply of liquid samples to an automated analyzer at a relatively high numerical rate of samples per unit of time. A further object is to provide such probe apparatus which is self-adjusting for immersion in liquid containers arranged at different heights.

There is provided liquid sample probe apparatus for an automated sample analyzer, including a movably mounted suction intake tube having an inlet end for immersion in a liquid of a succession of containers, a device to move the tube to raise and lower the inlet end to present the latter successively to the containers, and a motion damper to damp the raising movement of the tube inlet end from the contents of such a container, to prevent throw of fluid from the tube.

Further objects will be apparent from the following detailed description of the presently preferred embodiment.

BRIEF DESCRIPTION OF THE DRAWINGS

In the drawings:

FIG. 2 is a fragmentary perspective view of such probe apparatus further illustrating somewhat diagramatically the operating mechanism therefor; and FIG. 3 is an enlarged fragmentary view of the probe apparatus partially in elevational cross section, diagramatically illustrating the same in association with a liquid container.

DESCRIPTION OF THE PREFERRED EMBODIMENT

Figure 1:
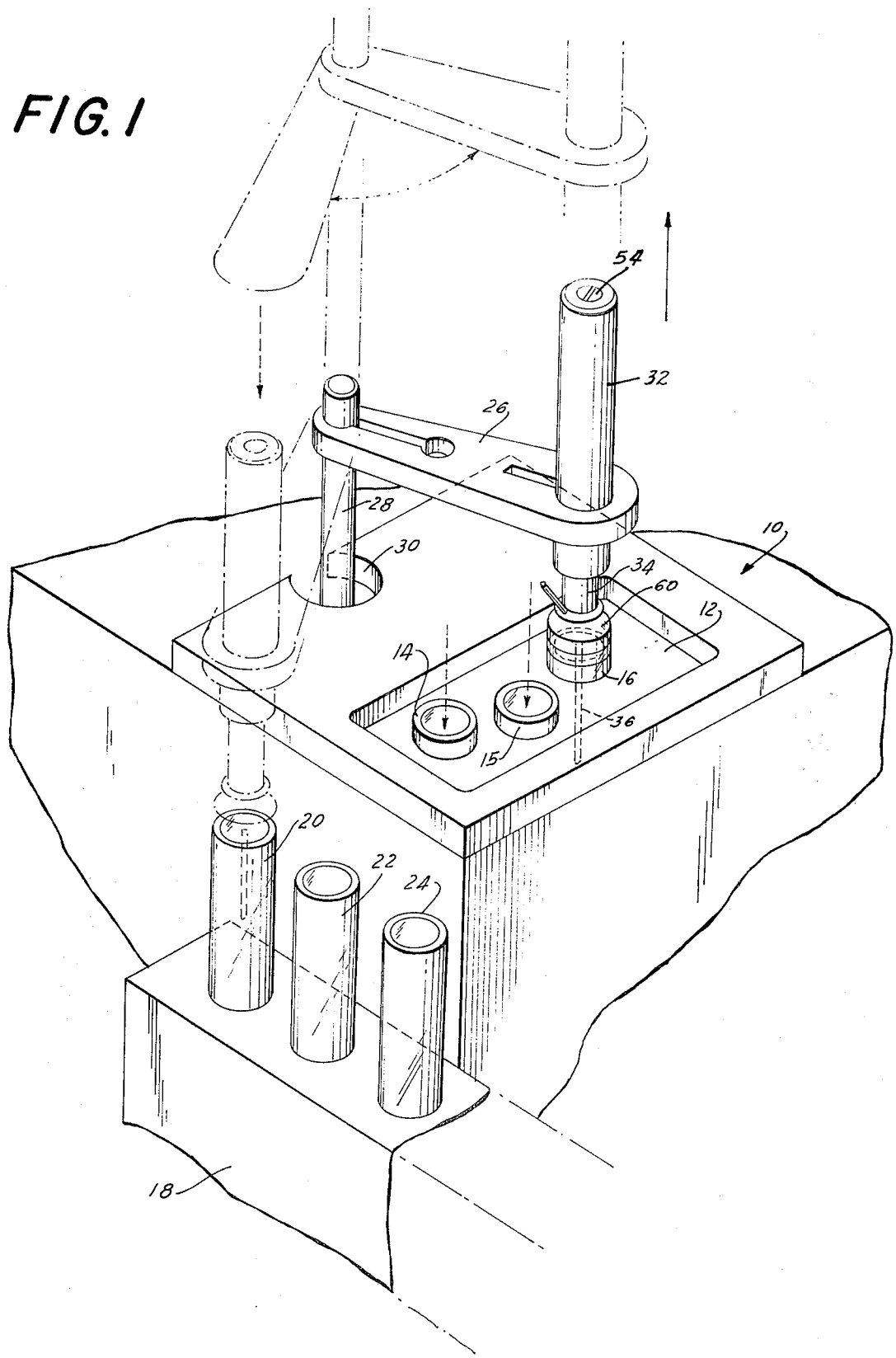
FIG. 1 is a fragmentary perspective view of a sampler for an automated analyzer, incorporating liquid sample probe apparatus embodying the invention.

In FIG. 1, a box-like housing portion of a sampler, indicated generally at 10, includes a deck part 12 in which are partially recessed a number of upwardly extending open-topped containers or tubes 14, 15 and 16, supported from below in non-illustrated fashion by the sampler, the tubes being spaced from one another as shown. A sample tray 18 for linear sliding movement in a horizontal direction is supported from the sampler in a non-illustrated manner for such movement past a sample offtake station. The tray 18 comprises a block having a plurality of linearly spaced upwardly facing sockets therein respectively receiving liquid sample containers 20, 22 and 24 of a form similar to test tubes. The tube 20 is shown in sample offtake position. The sample tray 18 is advanced periodically in increments as by a non-illustrated pawl, so that subsequent to offtake of sample from the tube 20 the tray is advanced to place tube 22 in the offtake position previously occupied by tube 20.

The probe apparatus for offtake of sample and other fluids includes a horizontal probe arm 26 in the form of a double-ended clamp. One end of the arm 26 is clamped in fixed position to the upper end portion of a support shaft 28, extending upwardly with considerable clearance through an opening 30 in the sampler housing portion 10. The shaft 28 swings in the opening 30 on a vertical pivot eccentric to the shaft in a manner to be described in detail hereinafter. The other end of the arm 26 is clamped in fixed position to the lower end of an upwardly extending cylinder 32, which has an opening in the bottom thereof for extension from and retraction of a piston 34. At the lower end of the piston 34 there is provided in fixed relation thereto a generally upwardly arranged capillary tube or probe 36 supported intermediate of its ends by the lower end of the piston. The lower end of the probe tube 36 constitutes a fluid inlet. The upper end of the probe tube 36, which projects laterally outwardly from the piston 36, may be secured in a conventional manner to the inlet end of a non-illustrated suction tube, which tube is in turn associated with a continuously operating pump of a suitable non-illustrated automated analyzer to create suction in the probe tube 36. The inlet end of the tube 36 is suspended a distance below the lower end of the piston 34.

As shown in FIG. 2 illustrating the operating mechanism for the probe, there is a fixed guide and pivot shaft 38 which is vertically arranged and has a vertically slidable and angularly movable thimble 40 thereon. A lever arm 42 has a pivot on one end thereof on which is rotatable a roller 43 held captive between the enlarged ends of the thimble 40. To the upper end of the thimble 40 is fixed an elongated horizontal clamping block 44 through the mid-portion of which the shaft 38 extends for sliding movement of the block on the shaft 38 with the thimble 40. To one end of the block and spaced laterally from the shaft 38 is clamped in fixed position therewith the lower end of the support shaft 28. To the opposite side of the shaft 38 and spaced therefrom is a vertically arranged shaft 46 received in a notch 48 in the other end of the block to guide the vertical movements of the block 44 with the thimble 40. A horizontal lever 50 has one end thereof fixed to the upper end of the guide shaft 46. The midportion of the lever 50 receives and is pivoted on the upper end portion of the pivot shaft 38. At a location to one side of the shaft 38 and remote from the shaft 46 the lever 50 slidingly receives therethrough the shaft 28. At the end of the lever 50 remote from the shaft 46 and beyond shaft 28 there is pivoted one end of a link 52. The lever 50 is secured against axial displacement on the shaft 38 in any conventional manner.

The link 52 has a push-pull effect on the lever 50 to move the lever angularly on the pivot shaft 38 in a manner to swing the block 44 bodily therewith. This movement swings the shafts 28 and 46 through an angle about the axis of the pivot shaft 38. Of course, the swinging movement of the shaft 28 on the last-mentioned axis effects swinging movement of the probe arm 26 fast to the shaft 28. The maximum swing of the probe arm is indicated by the solid-line position and the dashed-line position of the probe arm shown in FIG. 1. In the last-mentioned solid-line position, the probe 36 registers with the tube 16 recessed in the deck 12 and which tube contains wash solution. In the last-mentioned dashed-line position, the probe 36 registers with the sample container 20. Push-pull movement of the lever 50 is also effective to shift the probe arm 26 to two intermediate positions. In one of the last-mentioned intermediate positions of the probe arm 26, the probe 36 registers with the tube 15 recessed in the deck 12 and containing a liquid standard preparation, while in the other intermediate position of the probe arm 26 the probe 36 registers with the tube 14 recessed in the deck 12 and containing a different liquid standard preparation. It will be noted that the tubes 14, 15 and 16 recessed in the sampler deck 12 are supported by the sampler at a height or in a horizontal plane above the horizontal plane of the sample containers 20, 22 and 24 supported by the sample tray 18.

The probe arm 26 is raised and lowered by upward and downward swinging movements of the end of the lever arm 42 carrying the roller 43 held captive by the thimble 40 which is raised and lowered on the pivot shaft 38 by such swinging movements of the lever arm 42. Such movements of the thimble 40 fixed to the block 44 raise and lower the support shaft 28 fixed to the block 44 and fixedly carrying the probe arm 26 which moves vertically with the shaft 28. The uppermost position of the probe arm 26 is shown in dashed lines in FIG. 1.

Turning now to the construction of the cylinder 32 and the piston 34 best shown in FIG. 3, the upper end of the cylinder 32 has a needle valve 54 threaded therein to cooperate with an air passage through the upper end portion of the cylinder to control to a degree the passage of air into and out of the upper end of the cylinder. The piston 34, which is hollow to reduce weight and structured of a light-weight material which is preferably a metal, has an open upper end and a plugged lower end. An axial keyway 56 is formed in the wall structure of the piston to coact with a key 58 fixed to the arm 26, to limit the extension of the piston from the cylinder. The coaction of the key 58 and the keyway 56 also prevents rotation of the piston. The outer diameter of the piston and the inner diameter of the cylinder are held to close tolerances to provide a definite but controlled gap therebetween for the ingress and egress of air from the cylinder 32 through the lower end thereof around the piston.

A nut 60 is externally threaded on the lower end of the piston 34 in embracing relation to an angled portion of the probe 36 and removably clamps the probe to the piston in the position shown in FIG. 3. Suitably fixed to the bottom of the nut 60 is an annular resilient cushion or bumper member 62 through which the probe 36 extends. The probe also extends through a relatively thin washer 64 constructed of Teflon, for example, and which is fixed to the bottom of the bumper member 62. In FIG. 3, the piston 34 is shown almost fully retracted into the cylinder 32 by abutment of the piston washer 64 with the mouth of the wash solution receptacle 16. This receptacle may be filled to a higher level than the sample containers, so that after immersion in and withdrawal of the probe from sample, the probe 36 on immersion in the wash solution extends farther into the solution to wash off sample on the probe exterior. When the piston washer 64 abuts one of the sample containers such as container 20, the piston 34 is extended more fully from the cylinder 32 owing to the lower level at which sample containers are supported. The probe 36 when fully immersed in any of such liquid containers or receptacles closely approaches the bottom thereof.

The probe movements into and out of the liquid containers are described hereinafter. In a cycle of operation, the probe 36 aspirates air prior to immersion in the wash liquid of receptacle 16 in which it aspirates such wash solution to cleanse the probe interior of the preceding sample. The probe is lowered quickly into the receptacle 16. The bumper member 62 cushions the impact of the piston with the mouth of receptacle 16. After abutment with the receptacle which limits downward probe movement, the piston is retracted into the cylinder as aforesaid as air is forced out of the bottom of the cylinder around the piston. After aspiration of wash solution, the probe arm 26 is quickly lifted by the aforementioned probe operating mechanism the movements of which may be controlled conveniently on the command of a non-illustrated computer. On the initial portion of such upward movement of the arm 26 and the cylinder 32, the arm and cylinder accelerate rapidly but the piston-supported probe 36 moves upwardly at a slower rate owing to the inertia of and gravitational drag on the piston extending the latter, while the rate of extension is controlled by the restriction of air entering the cylinder between the latter and the piston and also entering past the valve 54. The friction of air on the outer surface of the piston as the air moves upwardly therearound into the expanding chamber formed by the piston and cylinder is believed to be a factor slowing the extension of the piston in addition to the partial vacuum in the cylinder. As a result of these forces, on lifting movement of the probe cylinder 32, the upward motion of the piston-supported probe is effectively damped to prevent what would otherwise be substantial impact of the floatingly mounted probe with its support. Air is aspirated into the probe 36 after the probe leaves the wash solution.

The piston-supported probe is then moved to register with the sample container 20 by the previously described probe operating mechanism and downward movement of the probe into the container 20 is limited by abutment of the probe washer 64 with the mouth of the container 20. As previously indicated, the piston-supported probe preferably pecks the sample by leaving it on upward movement with the arm-supported cylinder 34 and then re-entering it one or more times. After each withdrawal from the container 20, air is aspirated into the probe which forms a gas segment in the sample stream to isolate liquid sample segments and cleanse the probe. After such pecking, the probe is reimmersed in the sample for a longer period to aspirate such sample. The piston-supported probe 36 is then withdrawn from sample container 20 in the same manner as the previously described withdrawal from the wash solution tube 16 to damp upward lifting movement of the probe 36 to avoid probe shock and vibration.

After withdrawal from the sample in container 20, the probe 36 aspirates air prior to reimmersion in the wash solution in tube 16. After the probe 36 leaves the sample container 20, the sample tray 18 is advanced an increment by the aforementioned non-illustrated pawl to place the next following sample container 22 in sample offtake position. The cycle of probe movements is then repeated. The aforementioned needle valve 54 in the probe cylinder 32 may be adjusted to change the amount of damping of the piston 34 within limits, as desired.

On the command of the aforementioned non-illustrated computer, the previously described probe operating mechanism effects transfer of the probe 36 to the tubes 14 and 15 recessed in the sample deck 12 and containing different liquid standard preparations for aspiration thereof by the probe for analysis of the standards in the non-illustrated analyzer, which standards have known values. Such standards are conventionally used for calibration of such analyzers.

As previously indicated, the liquid sample probe apparatus supplies samples to an automated analyzer at a relatively high numerical rate, say 150 samples per hour. There is provided in such apparatus a floating probe to accommodate sampling from liquid containers supported at different levels, in which vertical probe movements are effectively damped to virtually eliminate probe shock or vibration likely to result in the throw of liquid from the probe exterior into the environment and loss of fluid from within the probe. In addition to the previously stated objects of the invention which are achieved are those which are apparent from the foregoing description, such as the superior guiding of the probe in its vertical movements by the coaction of the probe cylinder and probe piston, for example.

While only the presently preferred form of the liquid probe apparatus has been shown and described, it will be apparent, especially to those versed in the art, that the invention may take other forms and that the apparatus is susceptible to various changes in details without departing from the principles of the invention.

What is claimed is:

1. Sampler probe apparatus for delivery of a series of discrete liquid samples from from respective upwardly arranged receptacles, comprising: an element including an aspirating tubular probe having a suction inlet, a support for said element, means to move said support element between a lower sampling position and an upper non-sampling position, and means between said element and said support for damping upward movement of said element.

2. Apparatus as defined in claim 1, wherein: said means between said element and said support comprises means damping upward movement of said element during a predetermined displacement of said element on movement of the latter toward said upper position.

3. Apparatus as defined in claim 1, wherein: said means between said element and said support comprises means coupling said element and said support for bodily movement together toward said upper position after witdrawal of said probe from such liquid.

4. Apparatus as defined in claim 1, wherein: said probe aspirates sample and said probe end is a suction inlet, said motion damping means comprising a first element in which a second element is retractible and extensible therefrom, said probe being fixed to one of said elements.

5. Apparatus as defined in claim 1, wherein: said motion-damping means comprises an element, one of said elements comprinsing a cylinder and the other of said elements comprising a piston.

6. Apparatus as defined in claim 5, wherein: said cylinder and piston define an expansible air chamber therebetween, and said cylinder and piston further define therebetween a restricted air passage open to the ambient atmosphere for the ingress and egress of air from said cylinder.

7. Apparatus as defined in claim 1 further including a resilient bumper in fixed relation to said probe for abutment with the corresponding receptacle.

8. Apparatus as defined in claim 6, further including a valve controlling a second air passage through the end portion of said cylinder remote from the end portion thereof from which said piston extends.

9. Apparatus as defined in claim 6, wherein: said probe is fixed to said piston.

* * * * *